Figure 1:
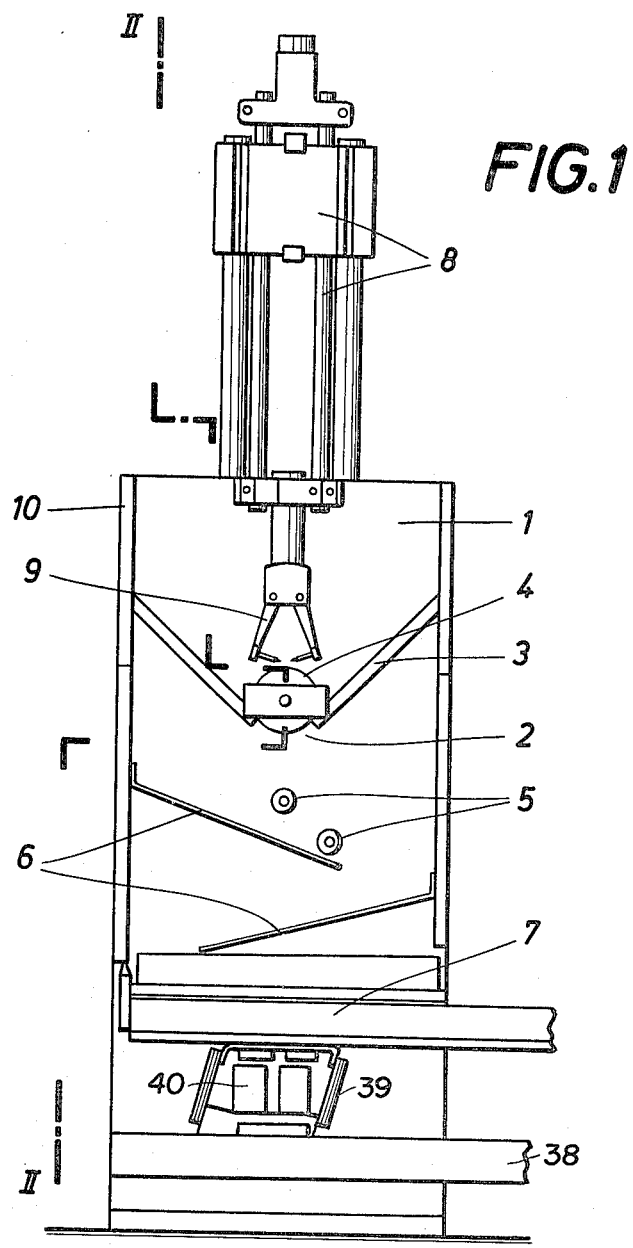

United States Patent [19]

Sticht

[11] 4,396,108
[45] Aug. 2, 1983

[54] APPARATUS FOR SEPARATING INDIVIDUAL ASSEMBLY PARTS FROM A COHERENT MASS

[76] Inventor: Walter Sticht, Wankhamerstrasse 8, A-4800 Attnang-Puchheim, Austria

[21] Appl. No.: 331,158

[22] Filed: Dec. 16, 1981

Related U.S. Application Data

[63] Continuation of Ser. No. 182,991, Sep. 2, 1980, abandoned, which is a continuation of Ser. No. 37,503, May 10, 1979, abandoned, which is a continuation-in-part of Ser. No. 826,307, Aug. 22, 1977, abandoned.

[30] Foreign Application Priority Data

Aug. 27, 1976 [AT] Austria .................................. 6392/76
Feb. 23, 1977 [AT] Austria .................................. 1189/77

[51] Int. Cl.³ ..................................................... B65G 47/14
[52] U.S. Cl. ...................................... 198/396; 198/443; 198/953; 209/664
[58] Field of Search ............... 198/396, 398, 443, 533, 198/953; 221/163, 164, 166, 167, 169, 170; 414/116; 209/664; 241/5, 85, 274, 301

[56] References Cited

U.S. PATENT DOCUMENTS

| | | | |
|---|---|---|---|
| 3,118,564 | 1/1964 | Vokes | 198/953 |
| 3,487,911 | 1/1970 | Wirz | 198/533 |
| 3,729,096 | 4/1973 | Fitzner et al. | 209/664 |
| 4,018,675 | 4/1977 | Petrucci | 209/664 |
| 4,058,236 | 11/1977 | Brennan | 221/163 |
| 4,063,642 | 12/1977 | Sticht et al. | 198/953 |
| 4,078,994 | 3/1978 | Hazelwood | 198/953 |
| 4,149,637 | 4/1979 | Starr | 209/664 |
| 4,231,687 | 11/1980 | Sticht | 198/953 |

Primary Examiner—Joseph E. Valenza
Attorney, Agent, or Firm—Kurt Kelman

[57] ABSTRACT

Individual assembly parts are separated from a coherent mass of the parts resting on a support by randomly sub-dividing the mass into clusters by continuously and successively lifting randomly selected clusters off the support and dropping the lifted clusters thereon until the mass is resolved into clusters and the clusters are further resolved. The continuous and successive lifting and dropping of the clusters causes continuously changing portions of the mass and clusters to rest on the support and the support is continuously and successively relieved of the weight of the randomly selected lifted clusters of assembly parts. The resolved clusters are singled into individual assembly parts and the individual parts are removed from the support to a conveyor where they are oriented.

6 Claims, 5 Drawing Figures

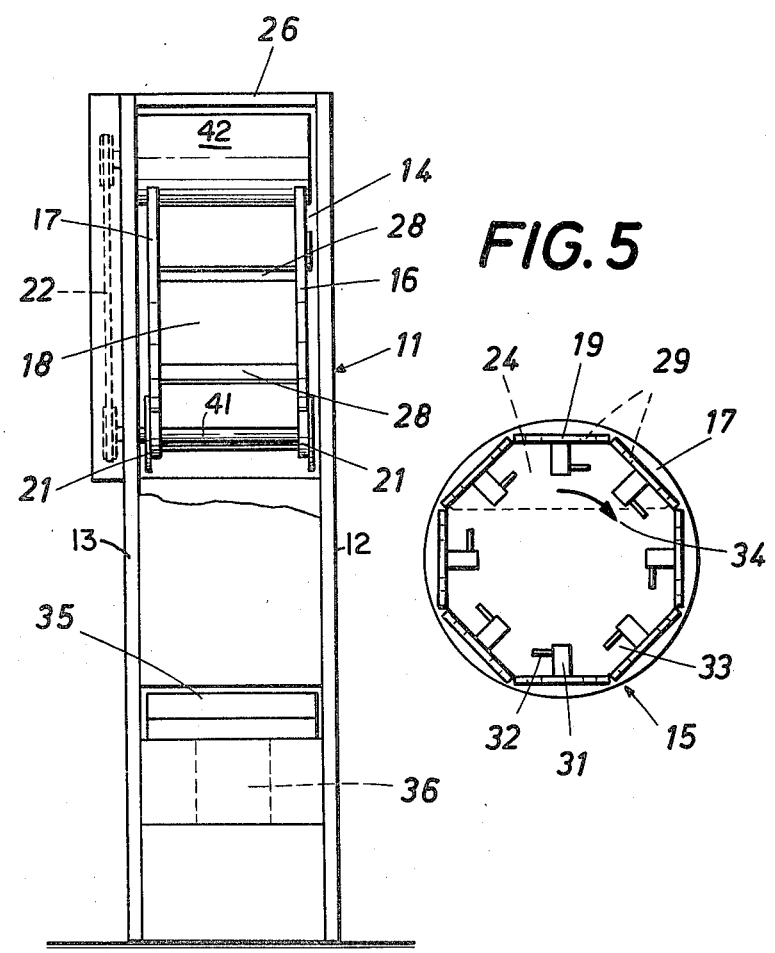

APPARATUS FOR SEPARATING INDIVIDUAL ASSEMBLY PARTS FROM A COHERENT MASS

This is a continuation of my copending application Ser. No. 182,991, filed Sept. 2, 1980 now abandoned, which is a continuation of my application Ser. No. 37,503, filed May 10, 1979, now abandoned, which was a continuation-in-part of my application Ser. No. 826,307, filed Aug. 22, 1977, now abandoned.

The present invention relates to improvements in a method and apparatus for separating individual assembly parts from a coherent mass of such parts resting on a support.

In assembly operations using such assembly parts as helical springs, contact and other electrical components, clips, pins, screws, bolts, small tubes, hooks, rings and the like, a major problem exist in delivering single assembly parts to the assembly line from a coherent mass of such parts, in which the parts randomly adhere to each other and may be completely entangled, as in the case of coil springs or hooks and other assembly parts of complex configuration.

Various methods and apparatus have been proposed for singling such assembly parts but they are effective only to a limited extent, being generally capable only of singling relatively loosely coherent parts or parts of a specific type or sturdy parts which are not readily damaged during the disentangling operation. When assembly parts of complicated shape, such as wire clips with multiple bends, are handled by the known singling procedures, the parts are frequently further snagged rather than being disentangled, forming additional clusters rather than resolving them into individual parts. Furthermore, even where the assembly parts are singled, the number of individual parts delivered from the coherent mass is subject to great variations, making it necessary to provide compensating storage devices downstream from the singling station to assure a steady delivery of the single parts to the assembly line.

Generally, vibratory bowls or plates have been used for singling parts, such as disclosed in U.S. Pat. Nos. 2,765,900 and 3,788,456, but on the whole these devices are effective only for relatively simply shaped assembly parts which are not strongly entangled. While the vibration of the support for the coherent mass of parts causes the support to shift in relation to the mass, the same portion of the mass continuously contacts the support. Experience has shown that this tends to lead to compression and, therefore, stronger coherence of the parts in the mass rather than to its resolution into single parts.

In copending U.S. Pat. No. 4,063,642, of which I am a joint inventor, it has been proposed to separate individual assembly parts from a coherent mass of the parts by first separating the mass into small clusters by a brush conveyor which moves these small clusters of parts into a whirlpool chamber where the clusters are resolved into single parts by a blast of air which ejects the singled parts and moves them to an orienting station where the single parts are oriented and conveyed to an assembly line or the like. This apparatus has been effectively used in commercial practice but, for parts with multiple bends or forming initially loose clusters having many empty cavities in their interior, the brush conveyor sometimes tends to make the clusters of parts denser rather than resolving them and the apparatus does not always work as effectively as may be desired.

U.S. Pat. No. 3,118,564 discloses an apparatus for separating helical springs from an entangled mass thereof wherein a mass of springs is introduced into the open upper end of a dielectric tube, a magnet is successively energized and de-energized to lift the mass and to permit it to fall, the resultant agitating effect causing individual springs to be separated. The individual springs adjacent the lower end of the mass are permitted to roll outwardly by the vibration of the overlying mass to the periphery of a support plate from which they can be removed. This apparatus can be used only with assembly parts of magnetizable material and, in practice, since the lower portion of the coherent mass in contact with the support remains unchanged by the magnetic lifting and lowering thereof in the tube, the weight of the mass will tend to prevent effective disentanglement and the outlet path will readily be jammed.

U.S. Pat. No. 3,729,096, discloses a slatted rotary drum for separating the leaves of a herb from the seeds and twigs thereof. As the drum is rotated, the leaves drop through the slots between the drum slats while the seeds and twigs are retained in the drum.

German Offenlegungsschrift No. 2,513,331 discloses a conveyor arrangement for removing individual parts from a random mass thereof, which comprises a rotary drum with peripherally arranged entrainment elements which are designed to catch individual parts and entrain them upwardly as the drum rotate, the upwardly entrained parts being then released and removed on a chute.

It is the primary object of the invention to provide a simple and universally effective method and apparatus for separating individual assembly parts of all types and shapes from a coherent mass of the parts.

It is another object of this invention to provide such a method and apparatus wherein the singled assembly parts are delivered at a substantially uniform rate per time unit.

The above and other objects are accomplished according to one aspect of the present invention by randomly subdividing the mass of assembly parts into clusters of these parts by continuously and successively lifting randomly selected ones of the clusters off the support on which the coherent mass of the parts rests and dropping the lifted clusters thereon until the mass is resolved into the clusters and the clusters are further resolved, the continuous and successive lifting and dropping of the clusters causing continuously changing portions of the mass and clusters to rest on the support and the support being continuously and successively relieved of the weight of the randomly selected lifted clusters of assembly parts. The resolved clusters are then singled into individual assembly parts and the individual assembly parts are removed from the support. Finally, the individual assembly parts removed from the support are oriented while the parts are conveyed away from the support. This method is fully effective with assembly parts which are entangled with each other in the coherent mass, in which case the mass is resolved by partially disentangling the parts to form the clusters and the clusters are resolved by further disentangling the parts.

According to another aspect of this invention, an apparatus is provided for separating individual assembly parts from a coherent mass of the parts, which comprises a receptacle for storing the mass of the parts, the receptacle including a support for the mass of the parts and the support defining an opening normally covered by the mass. Mechanical means is arranged in the receptacle for continuously and successively lifting random clusters of the assembly parts out of the mass and away from the opening in the support and for dropping the lifted clusters on the support whereby the mass is resolved into the random clusters and the clusters are further resolved by the impact of the dropped clusters on the support. The opening in the support is of a cross section permitting individual ones of the assembly parts from the resolved clusters to pass therethrough by gravity. Conveyor means is arranged for orienting individual ones of the assembly parts removed from the support through the opening.

The continuous and successive lifting and dropping of clusters of parts out of the coherent mass thereof, as well as the sliding of the mass and clusters along the inclined support of the receptacle constantly shifts the relative positions of portions of the mass and of the clusters to each other and to the support, and these cyclical random movements are very effective in resolving the mass and the clusters so that individual parts can be removed by gravity through a bottom outlet opening in the receptacle support at a substantially constant rate. If the assembly parts are sturdy enough to resist damage, it may be desirable to agitate the clusters while they are lifted out of the coherent mass, thus further loosening entanglements.

Figure 2:
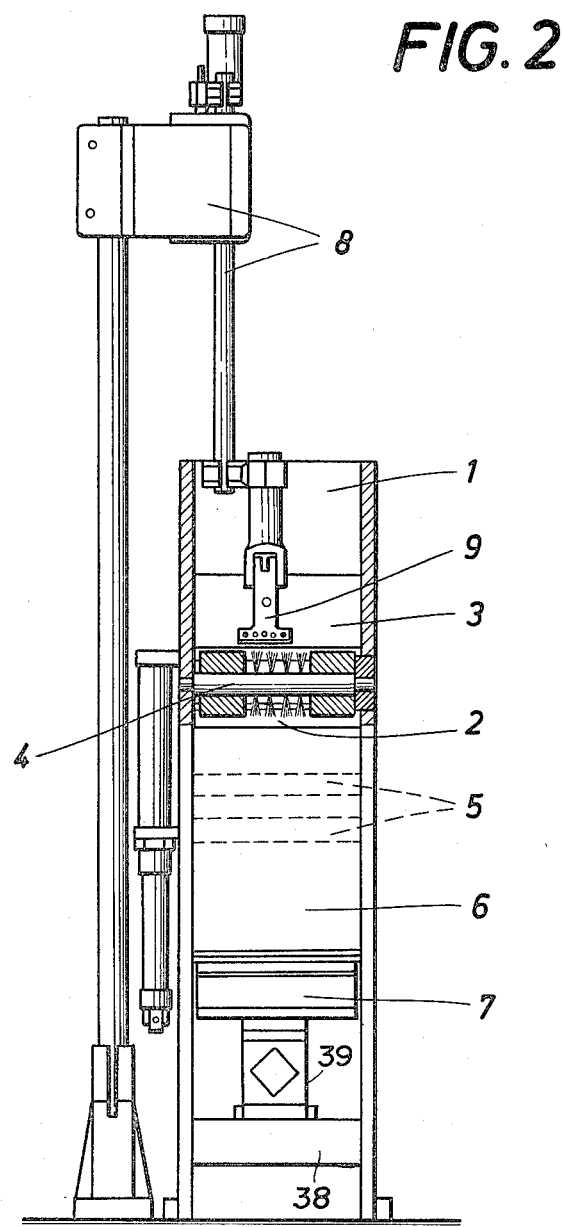
Figure 3:
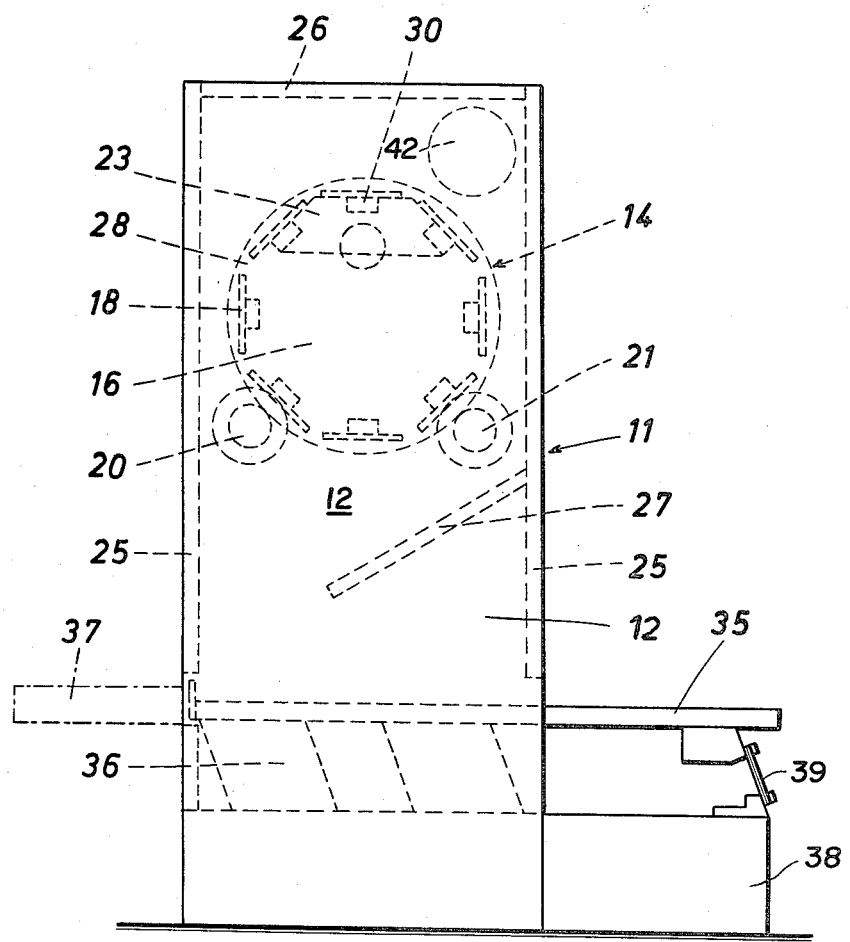

The above and other objects, advantages and features of the present invention will become more apparent from the following detailed description of certain now preferred embodiments thereof, taken in conjunction with the accompanying drawing wherein FIG. 1 shows a side view of one embodiment of the apparatus, with a side wall of the housing enclosing the apparatus removed to show the working elements of the apparatus;

FIG. 2 is a sectional view along line II—II of FIG. 1;

FIG. 3 schematically illustrates another embodiment of the apparatus, with the working elements in the interior of the supporting frame of the apparatus shown in broken lines;

FIG. 4 is a side elevational view of the apparatus of FIG. 3, with a side wall of the housing removed; and FIG. 5 shows an end view of a modified rotary drum for use in the apparatus of FIGS. 3 and 4.

Referring now to the drawing and first to FIGS. 1 and 2, the apparatus for separating individual assembly parts from a coherent mass of the parts (not shown) is shown to comprise receptacle 1 for storing the coherent mass of assembly parts. The receptacle includes a support for the mass of assembly parts and the support defines an opening normally covered by the mass. In the illustrated embodiment, the support comprises two inclined support plates 3 defining slot-shaped discharge opening 2 therebetween. The support plates form a trough-shaped bottom of receptacle 1 and the discharge opening is defined in the bottom of the receptacle.

A mechanical means 8, 9 is arranged in receptacle 1 for continuously and successively lifting random clusters of assembly parts out of the mass in the receptacle and away from opening 2 in support 3 and for dropping the lifted clusters on the support whereby the mass is resolved into the random clusters and the clusters are further resolved by the impact of the dropped clusters on support 3. In the illustrated embodiment, the mechanical means comprises device 9 for alternately gripping and releasing successive random clusters and drive 8 for continuously and successively moving gripping and releasing device 9 vertically towards and away from opening 2. Device 9 comprises reciprocable gripper tongs or jaws capable of gripping and releasing clusters of assembly parts upon reciprocation of the gripper tongs or jaws while drive 8 moves the device up and down, the ilustrated drive being a pneumatically operated cylinder-piston unit.

In this manner, the mass of assembly parts resting on support 3 is randomly sub-divided into clusters of the parts by continuously and successively lifting randomly selected clusters off the support and dropping the lifted clusters thereon until the mass of the assembly parts is resolved into the clusters and the clusters are further resolved on impact. The continuous and successive lifting and dropping of the clusters causes continuously changing portions of the mass and clusters to rest on support 3 as the mass glides therealong as the clusters are lifted and dropped, and the support is continuously and successively relieved of the weight of the randomly selected lifted clusters of assembly parts.

Opening 2 in the support is of a cross section permitting individual ones of the assembly parts from the resolved clusters to pass therethrough by gravity. In the illustrated embodiment, the cross section of the opening is large enough to permit a plurality of the assembly parts to pass therethrough and a driven, roller-shaped rotary brush 4 is mounted in opening 2 for singling the assembly parts in the resolved clusters dropped thereon and for discharging the singled assembly parts through opening 2. For this purpose, the rotary brush, whose axis of rotation extends substantially parallel to slot-shaped opening 2 and whose rotary axle is journaled in bearings in the side walls of receptacle 1, has bristles so shaped and arranged as to single the assembly parts, i.e. to separate the parts in the resolved cluster individually, the effective length of the bristles being so selected as to obtain a uniform discharge of the individually separated assembly parts through outlet opening 2. If the rotary brush is replaceably journaled in the receptacle, it may be exchanged and replaced by a brush with another type of bristle arrangement and length to adapt the apparatus for singling different types of parts and/or for controlling the rate of discharge of the singled parts. In this manner, the resolved clusters are singled into individual assembly parts and the individual assembly parts are removed from support 3.

The singled assembly parts fall from outlet opening 2 onto baffle and deflecting bars 5 mounted in the path of the parts underneath the opening whence the parts are guided onto cooperating slides 6 wherealong the singled assembly parts glide by gravity to be transmitted to conveyor means 7 for orienting the individual assembly parts removed from support 3 through opening 2. The orienting conveyor means may take any desired form and may be a type of vibratory, elongated, linearly extending conveyor defining longitudinal gutters holding successive ones of the parts as they are conveyed linearly therealong by vibration of the conveyor, such as more fully described and illustrated in U.S. Pat. No. 4,063,642. As shown, the conveyor is mounted on base 38 by means of leaf spring support 39 which is oscillated by magnet 40 to vibrate the conveyor in the direction of its longitudinal extension, such vibratory conveyors being conventional. If desired, the rotary brush may be omitted and any other suitable singling means, such as a whirlpool chamber, may be interposed between opening 2 and the conveyor means to deliver singled assembly parts thereto. At the outlet end of the conveyor (not shown), the singled and oriented assembly parts are delivered to an assembly station (not shown).

As shown in FIG. 1, one of the side walls of receptacle 1 has a removable gate 10 which may be lifted or opened to permit assembly parts, which may be entangled, to be delivered into the receptacle where they form the coherent mass which is to be separated into individual parts. When the mass consists of entangled assembly parts, such as coiled springs, the continuous and successive lifting and dropping of clusters of the entangled parts will effectively disentangle them until they are finally singled by rotary brush 4. If the assembly parts are not actually entangled but merely cohere under the weight of the mass, such as screws or bolts to be singled, the lifting and dropping of the clusters by mechanical means 8, 9 may suffice to single the parts for discharge through opening 2 without the need of singling and conveying brush 4. While the opening may be jammed under the weight of the mass in the receptacle, the continuous and successive relief of the weight of the randomly selected lifted clusters of assembly parts will enable single parts to become detached from the coherent mass and to glide singly through opening 2. The lifting and dropping of the clusters of assembly parts is repeated until the entire mass has been resolved into individual parts or at least such small clusters of loosely entangled parts that the parts are singled by the bristles of rotary brush 4.

Referring now to the embodiment of FIGS. 3 and 4, the apparatus may be used as that of FIGS. 1 and 2 in a three-step method of clustering, singling and orienting assembly parts from a mass of entangled parts, or in a two-step method of resolving a mass of entangled parts into predetermined clusters and orienting the clustered parts on a linear conveyor. The illustrated apparatus is shown to comprise supporting frame 11 including front wall 12 and rear wall 13 wherebetween rotary drum 14 is supported to form the receptacle for the coherent mass of assembly parts. As shown, the support for this mass comprises a plurality of axially extending slats 18 angularly offset relative to each other and constituting the peripheral wall of drum 14. Slats 18 define a plurality of slot-shaped openings 28 all around the peripheral wall, the slats in this embodiment being peripherally spaced from each other to define the openings therebetween. The slats are mounted between disc-shaped end walls 16 and 17 which they connect to form the receptacle for a coherent mass of assembly parts. A portion of end wall 16 is constituted by segmental gate 23 hinged to the wall so that it may be opened to charge the drum with the mass and locked again when the drum has been charged, at least an upper part of front wall 12 being removable to enable gate 23 to be opened and the drum to be charged.

The mechanical means arranged in receptacle drum 14 for continuously and successively lifting random clusters of assembly parts out of the coherent mass and away from openings 28 in the peripheral wall and for dropping the lifted clusters on the support comprises a drive 20-22 for rotating the drum about a generally horizontally extending axis and axially extending agitator bars 30 associated with slats 18 and projecting inwardly therefrom towards the axis for entraining random clusters of assembly parts during rotation of the drum whereby the random clusters are continously and successively lifted and dropped. In the illustrated embodiment, the drive comprises two pairs of rollers 20, 21, one pair of rollers being adjacent front wall 12 and the other pair of rollers being adjacent rear wall 13, and each pair of rollers supporting a respective end wall of the drum. Removable cover 26 is arranged on the front and rear walls of supporting frame 11. The cover is removed when it is desired to remove the drum and replace it by another one. In operation, the drum is supported by its end walls on the two pairs of rollers 20, 21. One of the rollers 20 of each pair is an idling roller rotatably supporting drum 14 while the other rollers 21 of the two pairs of rollers are driven rollers whose frictional contact with end wall 16 of the drum causes the drum to be rotated. As shown, rollers 21 of the two pairs of rollers are keyed to shaft 41 extending parallel to the axis of drum 14, one end of this shaft being rotatably journaled in rear wall 13 of the supporting frame and being connected to transmission 22 whose other end is connected to an output shaft of variable-speed motor 42 mounted on the rear wall. Adjusting the speed of the motor changes the rotary speed of the drum to produce desired operating conditions.

In the illustrated embodiment, drum 14 is used for singling the assembly parts and, for this purpose, openings 28 have a width permitting only successive single parts to pass therethrough by gravity whereby the parts are singled in the openings. If the drum were used merely for a preliminary disentangling operation wherein an entangled mass of parts is first separated into a multiplicity of small clusters of substantially uniform numbers of parts which are dropped through openings 28 for delivery to linear conveyor 7 for orienting the parts, the openings may have a width permitting the small clusters to fall through.

Slides or like guide surfaces 27 are mounted below drum 14 to receive the assembly parts dropping singly through lowermost openings 28 in the peripheral wall of the drum, the singled parts gliding down slide 27 to linear conveyor 35 which is equivalent to the vibratory conveyor illustrated in FIGS. 1 and 2 and described hereinabove, vibrator 36 being arranged to vibrate the conveyor for conveying the oriented parts to tray 37.

FIG. 5 shows a modified rotaty drum 15 for use in the apparatus of FIGS. 3 and 4 as a substitute for drum 14 and operating in a functionally equivalent manner. In the modified drum, the support for the coherent mass of assembly parts comprises a plurality of peripherally abutting, axially extending slats 19 angularly offset relative to each other and constituting the peripheral wall of drum 15. Each slat 19 defines slot-shaped openings 29 equivalent to openings 28 all around the peripheral wall. Hinged gate 24 in one end wall of the drum is equivalent to gate 23 to enable the drum to be changed and agitator bars 31 associated with slats 19 are equivalent to bars 30.

In addition, this embodiment further comprises entraining elements constituted by retaining pins 32 projecting from agitator bars 31 in a direction substantially parallel to the peripheral wall of drum 15 and spaced therefrom, space 33 bounded by slat 19, associated bar 31 and adjacent pin 32 being so dimensioned that, as the drum is rotated in the direction of arrow 34 to cause agitator bars 31 to sub-divide the mass of assembly parts into clusters by continuously and successively lifting selected clusters off support slats 19 and dropping the lifted clusters thereon until the mass is resolved into clusters and the clusters are further resolved, and pins 32 assist in relieving the support slats of the weight of the randomly selected lifted clusters of assembly parts, the resolved clusters are singled into individual assembly parts as they drop through the correspondingly dimensioned space 33 singly to pass through openings 29 at the bottom of space 33.

In all illustrated and hereinabove described embodiments of the present invention, a mass of coherent assembly parts, whether originally entangled or not, is effectively singled into individual parts in a first operating stage and the singled assembly parts are oriented in a generally conventional manner in a subsequent, second stage which receives the singled parts from the first operating stage. In the first stage, the mass is continuously and successively broken down into constantly shifting smaller and smaller clusters by relatively simple mechanical means until the smallest clusters are single to enable individual assembly parts to be removed to the second stage. The discharge rate of the individual parts from the first stage may be readily controlled by adjusting the rotary speed of singling brush 4 in the embodiment of FIGS. 1 and 2 or that of the drum 14 or 15 in the other embodiments. In all embodiments, the lifting and dropping of the clusters causes continuously changing portions of the coherent mass and clusters in the receptacle to rest on the support and the support surrounding the opening through which the singled parts are removed continuously and successively to be relieved of the weight of the randomly selected lifted clusters of assembly parts. As each cluster is lifted, the force of gravity causes it to become narrower and longer while it is widened and pressed together when dropped whereby the clusters constantly change in shape, the contact faces of adjacent parts in the clusters constantly change and the contact surfaces of the clusters with the support also constantly change. All of this is very effective in first resolving the mass and then further resolving the clusters in the receptacle even in case of heavy entanglement of the individual assembly parts in the original mass. Any small clusters not fully resolved into individual parts continue to be lifted and dropped until they are singled. The procedure and the illustrated apparatus described hereinabove is effective for singling the most complexly shaped assembly parts entangled in a coherent mass. Such masses are successively loosened by the successive lifting and dropping of randomly selected clusters thereof until the parts are entirely disentangled, the disentangled parts falling by gravity through the bottom opening in the receptacle to prevent renewed entanglement. In the rotary drum, the agitator bars continuously and successively lift random clusters out of the coherent mass during rotation of the drum, and the lifted clusters roll or drop back to the bottom of the drum, the contact faces between clusters, agitator bars and support constantly shifting and changing while the clusters are simultaneously agitated. All of this causes single parts finally to be detached from the coherent mass and to be removed by gravity through bottom openings in the drum.

The dimensions of the component parts of the apparatus will be adapted to the mass of parts to be resolved as well as to the size of the parts, the latter particularly determining the bristle arrangement of rotary brush 4 and the dimensions of the peripheral openings in rotary drum 14 or 15.

The method and apparatus of this invention are useful for all types of assembly parts tending to form coherent masses, including coil springs, complexly angled spring clamps, pins, bolts, screws and other metal parts, including reinforcing elements for reinforced concrete.

Where the discharge opening of the receptacle is described and claimed as having a width permitting only successive single assembly parts to pass therethrough by gravity whereby the parts are singled in the opening, this is understood to constitute a cross section of the opening which just permits passage of the single parts. Such a cross section may be smaller than the smallest projected section of a multi-angled or bent part. A hook is a simple example of such a part and the opening width for such a hook needs to exceed the cross section of one leg of the hook only by as much as will permit a turning and passage of the bight portion through the opening after passage of the one leg of the hook.

What I claim is:
1. An apparatus for separating individual assembly parts from a mass of said parts, which comprises
   (a) a receptacle for storing the mass of said parts, the receptacle including
      (1) a support for the mass of said parts, the support comprising two inclined support plates forming a bottom for the receptacle and the inclined support plates defining an opening therebetween in the bottom of the receptacle,
   (b) mechanical means arranged in said receptacle for continuously and successively lifting clusters of assembly parts out of said mass and away from the opening in the bottom of the support and for dropping the lifted clusters on the bottom of the support whereby the mass is resolved into random ones of said clusters and the clusters are further resolved by the impact of the dropped clusters on the bottom of the support, the opening in the bottom of the support being of a cross section permitting individual ones of the assembly parts from the resolved clusters to pass therethrough by gravity,
   (c) a rotary brush mounted in the bottom of the support and covering said opening for singling the assembly parts in the resolved clusters and for discharging the singled assembly parts through the opening, the brush being spaced from the opening to permit passage of the singled assembly parts from the support plates through the opening, and
   (d) conveyor means for orienting the singled assembly parts removed from the support through the opening.

2. An apparatus for separating individual assembly parts from a mass of said parts, which comprises
   (a) a rotary drum receptacle for storing the mass of said parts, the receptacle including
      (1) a support for the mass of said parts, the support defining an opening normally covered by the mass and comprising a plurality of axially extending slats angularly offset relative to each other and constituting the peripheral wall of the drum, the slats defining openings all around the peripheral wall and the lowest one of said openings constituting the opening of the support,
   (b) mechanical means arranged in the rotary drum receptacle for continuously and successively mechanically engaging and lifting clusters of assembly parts out of said mass and away from the opening in the support and for mechanically releasing and dropping the lifted clusters on the support whereby the mass is resolved into random ones of said clusters and the clusters are further resolved by the impact of the dropped clusters on the support, the mechanical means comprising (1) a drive for rotating the drum about a generally horizontally extending axis and
(2) axially extending agitator bars associated with the slats and projecting inwardly therefrom towards the axis for entraining random clusters of assembly parts during rotation of the drums whereby the random clusters are continuously and successively lifted and dropped,
(c) the opening in the support being of a cross section permitting individual ones of the assembly parts from the resolved clusters to pass therethrough by gravity, and
(d) conveyor means for orienting individual ones of the assembly parts removed from the support through the opening.

3. The apparatus of claim 2, wherein the slats are peripherally spaced from each other to define the openings therebetween.

4. The apparatus of claim 2, wherein the slats abut peripherally and the openings are defined in each one of the slats.

5. The apparatus of claim 2, wherein the openings have a width permitting only successive single ones of said assembly parts to pass therethrough by gravity whereby the parts are singled in said openings.

6. The apparatus of claim 2, further comprising entrainment elements projecting from the agitator bars in a direction substantially parallel to the peripheral wall of the drum and spaced therefrom.

* * * * *